(12) United States Patent
Yashiki

(10) Patent No.: US 8,915,796 B2
(45) Date of Patent: Dec. 23, 2014

(54) GOLF CLUB SHAFT AND GOLF CLUB

(71) Applicant: Dunlop Sports Co. Ltd., Kobe-shi, Hyogo (JP)

(72) Inventor: Tatsuya Yashiki, Kobe (JP)

(73) Assignee: Dunlop Sports Co. Ltd, Kobe (JP)

( * ) Notice: Subject to any disclaimer, the term of this patent is extended or adjusted under 35 U.S.C. 154(b) by 121 days.

(21) Appl. No.: 13/717,358

(22) Filed: Dec. 17, 2012

(65) Prior Publication Data

US 2013/0172099 A1 Jul. 4, 2013

(30) Foreign Application Priority Data

Dec. 29, 2011 (JP) .................................. 2011-290434

(51) Int. Cl.
*A63B 53/10* (2006.01)

(52) U.S. Cl.
USPC ......................................................... 473/319

(58) Field of Classification Search
USPC ......................................................... 473/319
See application file for complete search history.

(56) References Cited

U.S. PATENT DOCUMENTS

| | | | | |
|---|---|---|---|---|
| 1,968,616 A | * | 7/1934 | Oldham | 473/298 |
| 4,319,750 A | * | 3/1982 | Roy | 473/320 |
| 5,277,973 A | * | 1/1994 | Yamamura et al. | 428/367 |
| 5,538,769 A | * | 7/1996 | Sandman, Jr. | 428/36.3 |
| 5,626,529 A | * | 5/1997 | Roy | 473/319 |
| 5,788,585 A | * | 8/1998 | Jackson | 473/292 |
| 5,904,627 A | * | 5/1999 | Miyaji et al. | 473/319 |
| 6,270,426 B1 | * | 8/2001 | Matsumoto | 473/319 |
| 6,602,148 B2 | * | 8/2003 | Hsu | 473/319 |
| 8,491,411 B2 | * | 7/2013 | DeShiell et al. | 473/320 |
| 2002/0119830 A1 | * | 8/2002 | Jackson | 473/316 |
| 2009/0209360 A1 | * | 8/2009 | Lee | 473/319 |

FOREIGN PATENT DOCUMENTS

| | | | | | |
|---|---|---|---|---|---|
| JP | 11206935 A | * | 8/1999 | | A63B 53/10 |
| JP | 2004066831 | | * | 3/2004 | |
| JP | 2004066831 A | * | 3/2004 | | B32B 5/28 |
| JP | 2007-135811 A | | 6/2007 | | |
| JP | 2009240429 A | * | 10/2009 | | |

* cited by examiner

*Primary Examiner* — Stephen L. Blau
(74) *Attorney, Agent, or Firm* — Birch, Stewart, Kolasch & Birch, LLP

(57) ABSTRACT

A golf club shaft has a tip end to which a golf club head is attached and a butt end to which a grip is attached, wherein the shaft is composed of a fiber reinforced resin having a fiber layer, the fiber layer contains a bias layer having bias fibers oriented at an angle with respect to an axial direction of the shaft, the bias layer includes a tip-side bias layer extending from the tip end toward the butt end and having a butt-side end terminating without reaching the butt end and a butt-side bias layer extending from the butt end toward the tip end and having a tip-side end terminating without reaching the tip end, and bias fibers in the tip-side bias layer has a tensile elastic modulus smaller than that of bias fibers of the butt-side bias layer.

13 Claims, 5 Drawing Sheets

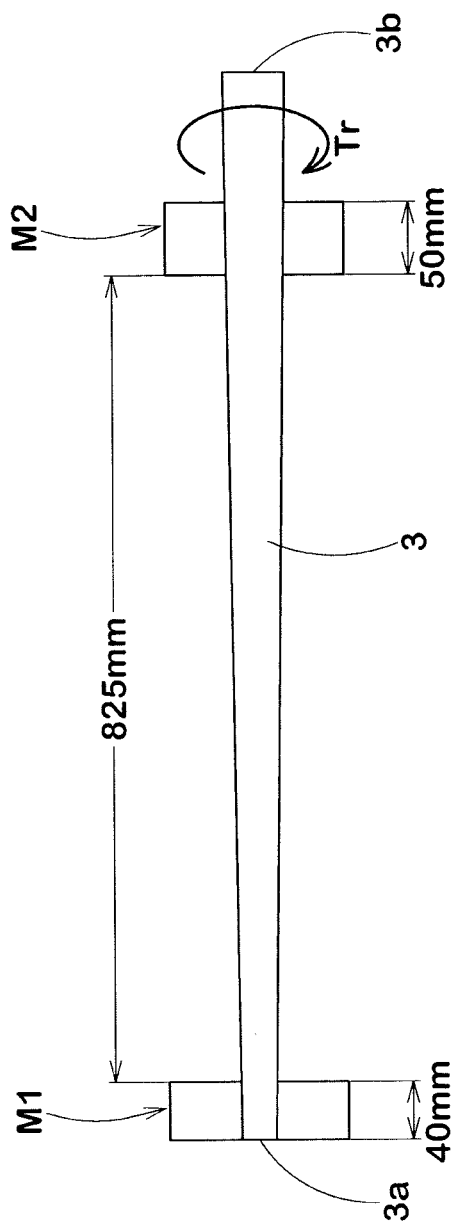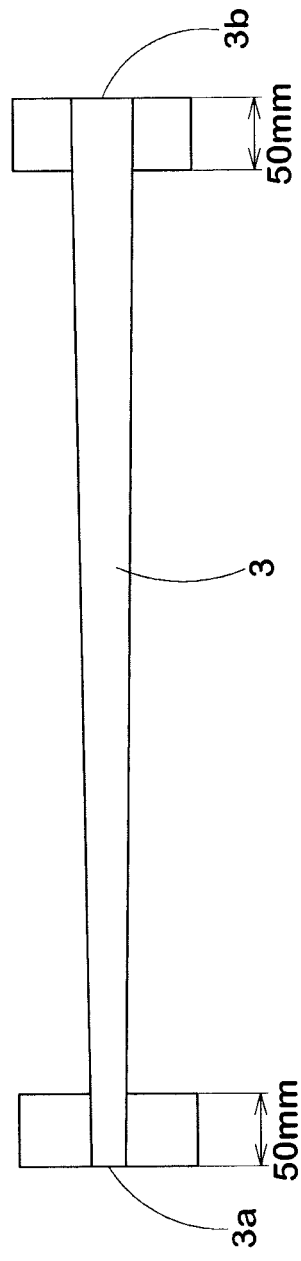
FIG.6
FIG.7

GOLF CLUB SHAFT AND GOLF CLUB

BACKGROUND OF THE INVENTION

1. Field of the Invention

The present invention relates to a golf club shaft and a golf club having hit ball feeling and directional stability of a hit ball improved in a well-balanced manner.

2. Description of the Related Art

Conventionally, a golf club shaft composed of a fiber reinforced resin which includes a fiber layer and a matrix resin has been known. The fiber layer contains a bias layer having bias fibers oriented at an angle with respect to the axial direction of the shaft. The larger a tensile elastic modulus of bias fibers is, the larger torsional rigidity of the shaft is. A golf club shaft having a tip-side bias layer and a butt-side bias layer spaced from the tip-side bias layer has been developed. For bias fibers in the tip-side bias layer, those having a larger tensile elastic modulus than that of bias fibers in the butt end side are adopted. Since such a shaft has large torsional rigidity at the tip end side, a trajectory of a head during a golf swing is stabilized, which thus enables improvement of the directional stability of a hit ball.

SUMMARY OF THE INVENTION

However, since the shaft above has the large torsional rigidity at the tip end side, it has a problem that shock at impact may not be easily absorbed, and thereby undesirable hit feeling may be produced. In addition, the larger the tensile elastic modulus of bias fibers is, the smaller torsional strength of the shaft is. Therefore, such a shaft has a problem that it is weak to repeated load and has poor durability.

The present invention has been worked out in light of the circumstances described above, and has a main object of providing a golf club shaft and a golf club having the hit ball feeling and the directional stability of a hit ball improved in a well-balanced manner.

In accordance with the present invention, there is provided a golf club shaft having a tip end to which a golf club head is attached and a butt end to which a grip is attached, wherein the shaft is composed of a fiber reinforced resin having a fiber layer, the fiber layer contains a bias layer having bias fibers oriented at an angle with respect to an axial direction of the shaft, the bias layer includes: a tip-side bias layer extending from the tip end toward the butt end and having a butt-side end terminating without reaching the butt end; and a butt-side bias layer extending from the butt end toward the tip end and having a tip-side end terminating without reaching the tip end, bias fibers of the tip-side bias layer has a tensile elastic modulus smaller than that of bias fibers of the butt-side bias layer, and the butt-side end of the tip-side bias layer and the tip-side end of the butt-side bias layer are provided in a same position in the axial direction of the shaft, or in a position where the tip-side bias layer and the butt-side bias layer overlap each other.

BRIEF DESCRIPTION OF THE DRAWINGS

FIG. 6 is a diagrammatic view illustrating a method for measuring torque of a shaft.

FIG. 7 is a diagrammatic view illustrating a method for measuring torsional strength of a shaft.

DESCRIPTION OF THE PREFERRED EMBODIMENTS

In the following, one embodiment of the present invention will be described based on the drawings.

Figure 1:
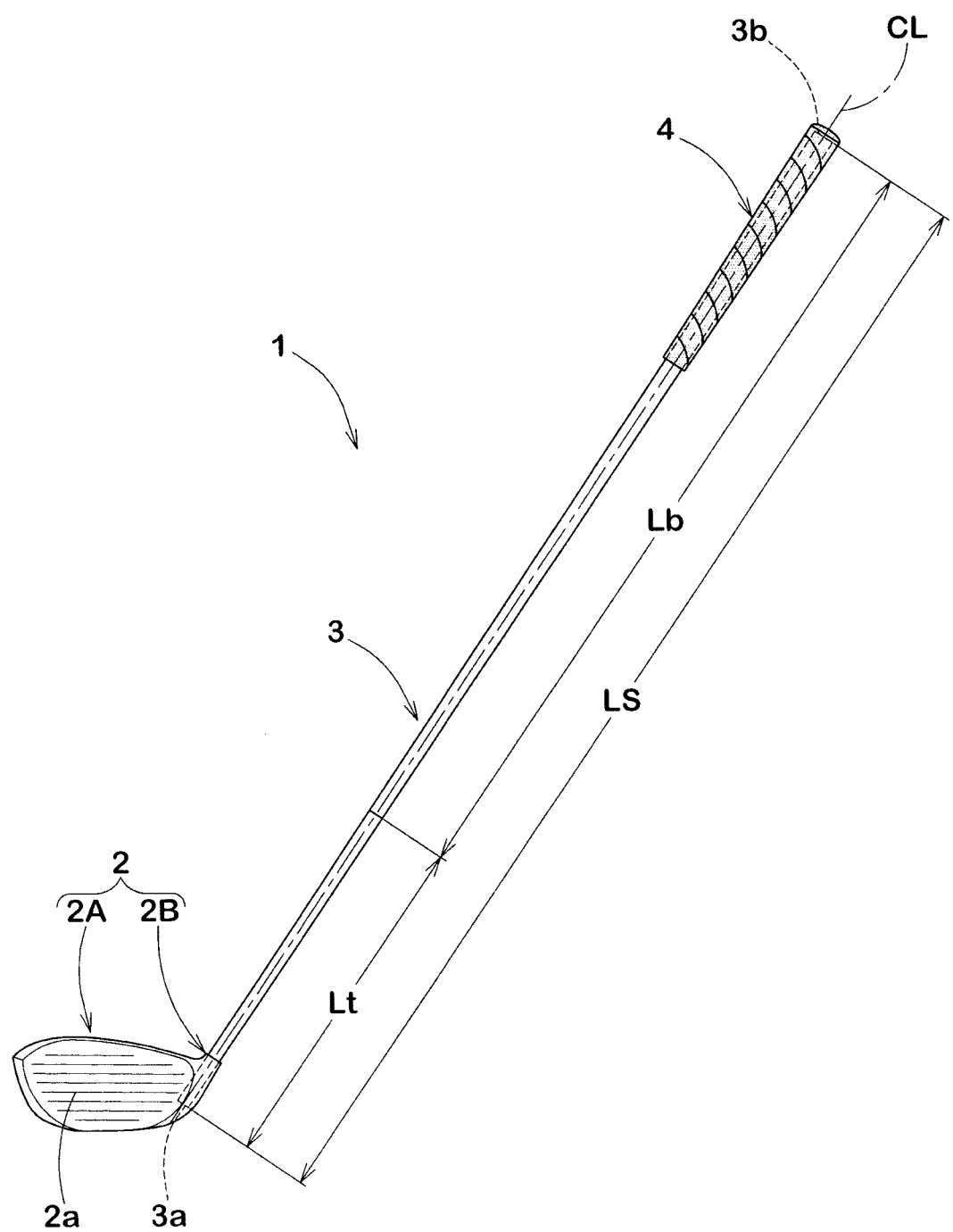
FIG. 1 is a plan view a golf club under a standard state according to an embodiment of the present invention.

In the embodiment, a wood-type golf club is shown by an example. The present invention is also applicable to a utility-type or iron-type golf club. FIG. 1 is a front view of a golf club 1 of the embodiment. The golf club 1 includes a golf club head 2, a golf club shaft (hereinafter also simply referred to as a "shaft") 3, and a grip 4.

Although no specific limitation is set on mass of the golf club 1, excessively large mass of the golf club 1 makes it difficult to swing the golf club, and becomes difficult to accelerate of the head speed. Thus, the mass of the golf club 1 is preferably equal to or less than 308 g, more preferably equal to or less than 300 g, and even more preferably equal to or less than 292 g. on the other hand, if the mass of the golf club 1 is excessively small, strength of the head 2 or shaft 3 whose weight is trimmed easily decreases, and durability tends to deteriorate. From such a standpoint, the mass of the golf club 1 is preferably equal to or greater than 270 g and more preferably equal to or greater than 273 g.

Although no specific limitation is set on length of the golf club 1, excessively small length of the golf club 1 makes it difficult to obtain a sufficient head speed due to a small radius of swing, while swinging becomes easy. Thus, the length of the golf club 1 is preferably equal to or greater than 44.0 inches, more preferably equal to or greater than 44.5 inches, and even more preferably equal to or greater than 45.0 inches. On the other hand, since large length of the golf club 1 makes swinging difficult, the head speed may decrease. From such a standpoint, the length of the golf club 1 is preferably equal to or less than 47.0 inches, more preferably equal to or less than 46.5 inches, and even more preferably equal to or less than 46.0 inches.

The length of the golf club is measured based on the description of "1c Length" in "1 Club" of "Attached Regulation II Design of club" defined by Royal and Ancient Golf Club of saint Andrews (R&A).

The head 2 of the embodiment includes a hollow typed head main body 2A having a face 2a for hitting a ball, and a cylindrical hosel portion 2B which is provided on a heel side of the head main body 2A and into which a tip end 3a of the shaft 3 is inserted and fixed.

Although no specific limitation is set on the head 2, for example, titanium, titanium alloy, carbon fiber reinforced plastic (CFRP), stainless steel, maraging steel or soft iron and the like is used for the head 2. In addition, the head 2 may be made of a combination of plural kinds of materials. In order to lower a center of gravity of the head 2, for example, at least a part of a head top surface may be constituted of CFRP and at least a part of a head bottom surface may be constituted of titanium alloy.

Although no specific limitation is set on the mass of the head 2, excessively small mass of the head 2 does not enable kinetic energy of the head 2 to be adequately transferred to a ball, thus making it difficult to increase a speed of a hit ball. Thus, the mass of the head 2 is preferably equal to or greater than 185 g and more preferably equal to or greater than 192 g. on the other hand, excessively large mass of the head 2 increases weight of the golf club 1, making it difficult to swing. From such a standpoint, the mass of the head 2 is preferably equal to or less than 210 g, more preferably equal to or less than 206 g, and even more preferably equal to or less than 203 g.

As for the grip 4, a general grip is adopted as appropriate. For the grip 4 is used a vulcanized molded article of a composition obtained by blending oil, carbon black, sulfur, and zinc oxide into natural rubber and kneading it.

It is desirable that mass of the grip 4 is preferably set in a range from 25 to 50 g to maintain its strength, durability, and swing easiness of the club 1.

The tip end 3a of the shaft 3 is fixed to the hosel portion 2B of the head 2. The grip 4 is attached to a butt end 3b side of the shaft. Thus, the tip end 3a of the shaft 3 is located inside the head 2, and the butt end 3b of the shaft 3 is located inside the grip 4, respectively. The shaft 3 of the embodiment has a tapered shape with a shaft diameter (outer diameter) gradually decreasing from the butt end 3b toward the tip end 3a. The shaft 3 is formed to be a tubular body having a circular cross section.

It is desirable that mass Ws of the shaft 3 is in a range of from 30 to 70 g. When the mass Ws of the shaft 3 is small, its wall may be thin and bending strength and the like may decrease if necessary length is ensured. In addition, if the mass Ws of the shaft 3 is large, the golf club 1 may become heavy and a swing speed may decrease.

It is desirable that total length LS of the shaft 3 is in a range of from 1050 to 1200 mm. When the total length LS is small, a radius of swing becomes small, and it is difficult to obtain a sufficient head speed. To the contrary, when the total length LS is excessively large, moment of inertia of the club 1 may increase, making swinging difficult.

Next, a structure of the shaft 3 of the embodiment will be described. The shaft 3 is constituted of a fiber reinforced resin containing a fiber layer, and a resin which hardens resin layer. The shaft 3 made of the fiber reinforced resin is lighter than a steel shaft, and makes it easy to adjust flexural rigidity and the like.

Fibers constituting the fiber layer preferably have small specific gravity, and high elastic modulus and strength. As the fiber layer, for example, a graphite fiber, aramid fiber, silicon carbide fiber, alumina fiber, boron fiber, or glass fiber and the like is adopted. Above all, a carbon fiber is desirable.

In order to increase adhesive strength with the fiber, as the resin, for example, an unsaturated polyester resin, phenol resin, melamine resin, urea resin, diallyl phthalate resin, polyurethane resin, polyimide resin, or silicon resin is adopted. Above all, an epoxy resin is desirable.

The shaft 3 made of the fiber reinforced resin is formed by a sheet winding manufacturing method which winds and laps multiple prepreg sheets P which are fiber layers impregnated with uncured resin.

Figure 2:
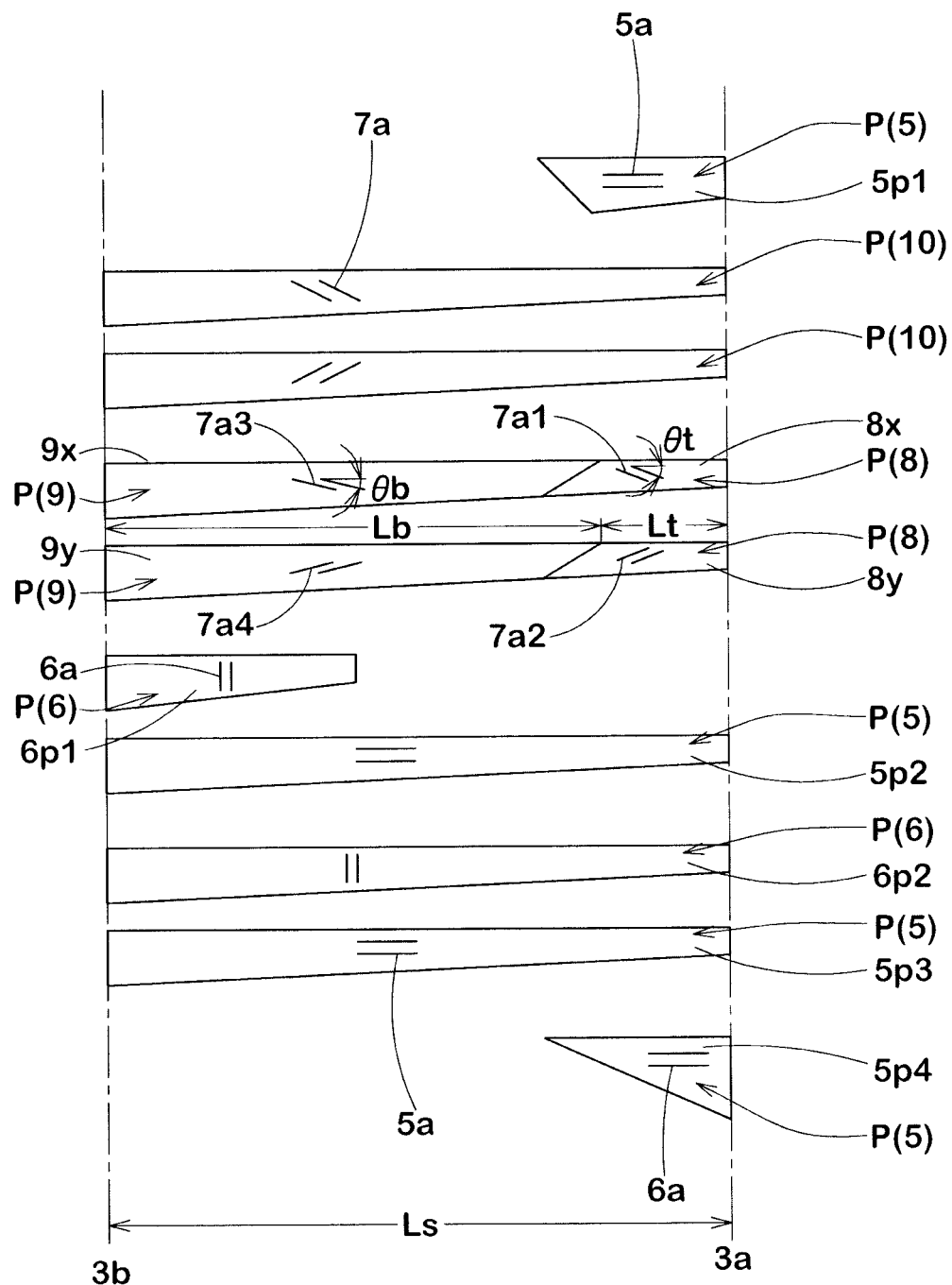
FIG. 2 is a development view of prepreg sheets constituting a golf club shaft of the embodiment.

FIG. 2 shows one example of a development view (sheet configuration diagram) of the prepreg sheets P constituting the shaft 3 of the embodiment. The prepreg sheets P are sequentially wrapped around a mandrel, starting with one located in the upper side of FIG. 2. The shaft 3 may further include prepreg sheets P which are not shown in FIG. 2. In FIG. 2, a horizontal direction is an axial direction of the shaft parallel to a central axis CL of the shaft (as shown in FIG. 1), the right side showing the ti p end 3a side and the left side showing the butt end 3b side of the shaft 3, respectively. In addition, FIG. 2 shows positions where each prepreg sheet P is provided in the axial direction of the shaft.

For the prepreg sheets P, a unidirectional (UD) prepreg sheet in which fibers are oriented in a substantially one direction is used. Any prepreg (for example, a cross prepreg sheet in which reinforced fibers are organized, and the like) other than the UD prepreg may be used.

A fiber layer includes: a straight layer 5 constituted of layers of straight fibers 5a which are oriented at substantially 0 degree with respect to the axial direction of the shaft; a hoop layer 6 constituted of layers of hoop fibers 6a which are oriented substantially 90 degrees with respect to the axial direction of the shaft; and a bias layer 7 constituted of layers of bias fibers 7a oriented at angles with respect to the axial direction of the shaft. Note that "substantially" means that a manufacturing error is considered. For example, for the straight layer 5, an angle of the fibers with respect to the axial direction of the shaft includes not only 0 degree but also a range of 0 plus/minus 10 degrees. Similarly, for the hoop layer 6, an angle of the fibers with respect to the axial direction of the shaft includes not only 90 degrees but also a range of 90 plus/minus 10 degrees.

The straight layer 5 is highly correlated with flexural rigidity and bending strength of the shaft 3, and is a main constituent material of the shaft 3.

The hoop layer 6 contributes to increasing of crushing rigidity and crushing strength of the shaft 3. The "crushing rigidity" and "crushing strength" mean rigidity and strength to force of crushing the shaft 3 radially inwardly. In addition, since crushing deformation occurs in conjunction with bending deformation, the crushing strength is also related to the bending strength. This especially affects a light shaft with small thickness. Therefore, increasing the crushing strength enables the bending strength of the shaft to be improved.

In the embodiment, the bias layer 7 contains a tip-side bias layer 8 extending from the tip end 3a toward the butt end 3b of the shaft 3 and having a butt-side end 8b (shown in FIGS. 3a, 3b, 4a and 4c) terminating without reaching the butt end 3b, a butt-side bias layer 9 extending from the butt end 3b toward the tip end 3a and having a tip-side end 9t (shown in FIGS. 3a, 3b, 4a and 4c) terminating without reaching the tip end 3a, and a total length bias layer 10 extending from the tip end 3a to the butt end 3b.

In this embodiment, tensile elastic modulus Et of bias fibers in the tip-side bias layer 8 is smaller than tensile elastic modulus Eb of bias fibers in the butt-side bias layer 9. This makes torsional rigidity at the tip end 3a side of the shaft 3 smaller, and torsional strength greater. Such a shaft 3 provides absorption of shock at impact, improved hit ball feeling, and improved durability. In addition, since the shaft 3 has larger torsional rigidity on the butt end 3b side, amount of torsion as the entire shaft is controlled, thus stabilizing a head trajectory during a swing. This improves the directional stability of a hit ball.

Here, when a difference Eb-Et between the tensile elastic modulus Eb and the tensile elastic modulus Et is small, the action described above may not work in a well-balanced manner. To the contrary, when the difference Eb-Et is large, the amount of torsion as the entire shaft is not controlled, thus degrading the directional stability of a hit ball. For this reason, the difference Eb-Et is preferably equal to or greater than 8 t/mm$^2$ and more preferably 10 t/mm$^2$, and preferably equal to or less than 40 t/mm$^2$ and more preferably equal to or less than 35 t/mm$^2$.

The tensile elastic modulus Eb of bias fibers in the butt-side bias layer 9 in this embodiment is preferably equal to or greater than 30 t/mm$^2$ and more preferably equal to or greater than 35 t/mm$^2$, and preferably equal to or less than 60 t/mm$^2$ and more preferably equal to or less than 55 t/mm$^2$. Specifically, when the tensile elastic modulus Eb is large, the torsional rigidity is excessively large, and effect of improving the hit ball feeling may not be achieved adequately. To the contrary, when the tensile elastic modulus Eb is small, the amount of torsion as the entire shaft cannot be controlled, and effect of improving the directional stability of the hit ball may not be achieved adequately.

From a similar viewpoint, the tensile elastic modulus Et of bias fibers in the tip-side bias layer 8 is preferably equal to or greater than 20 t/mm$^2$ and more preferably equal to or greater than 25 t/mm$^2$, and preferably equal to or less than 40 t/mm$^2$ and more preferably equal to or less than 35 t/mm$^2$.

Figure 3A:
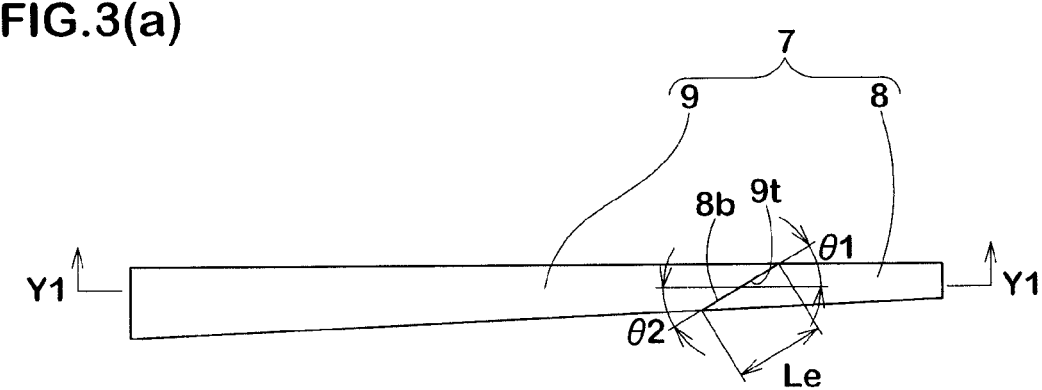
FIG. 3A is a development view of a bias layer of the embodiment, consisting of a tip-side bias layer and a butt-side bias layer.
Figure 3B:
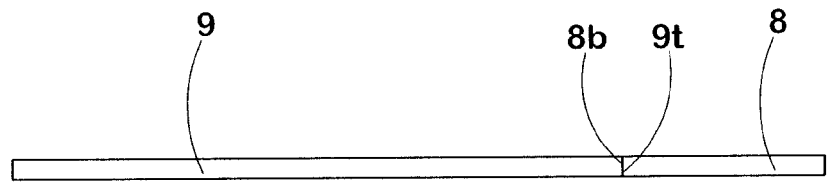
FIG. 3B is a cross sectional view taken along the line Y1-Y1 of FIG. 3A.

In the embodiment in FIGS. 3A and 3B, the butt-side end 8b of the tip-side bias layer 8 and the tip-side end 9t of the butt-side bias layer 9 are provided in a same position in the axial direction of the shaft. In this embodiment in FIGS. 4A and 4B, the butt-side end 8b of the tip-side bias layer and the tip-side end 9t of the butt-side bias layer 9 are provided in a position where the tip-side bias layer 8 and the butt-side bias layer 9 overlap each other. The present invention includes these embodiments. Since the tip-side bias layer 8 and the butt-side bias layer 9 are provided over the total length of the shaft 3, such a shaft 3 can control a local decrease in the torsional strength of the shaft 3 in the shaft axis direction, and further improve the durability.

Figure 4A:
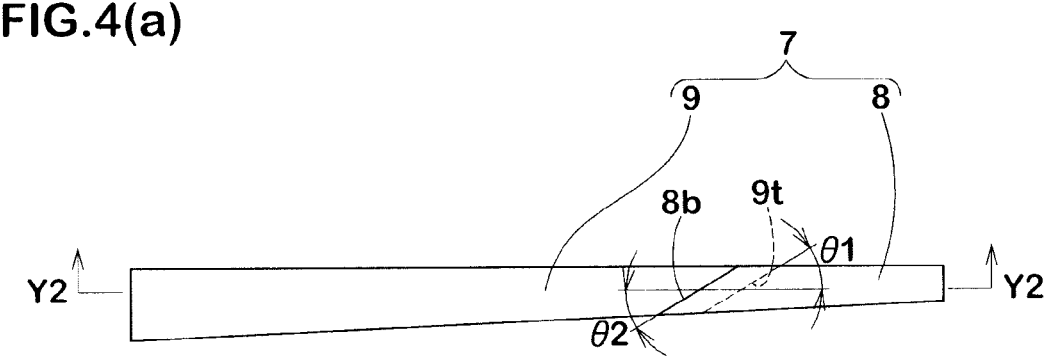
FIG. 4A is a development view of a bias layer of other embodiment.
Figure 4B:
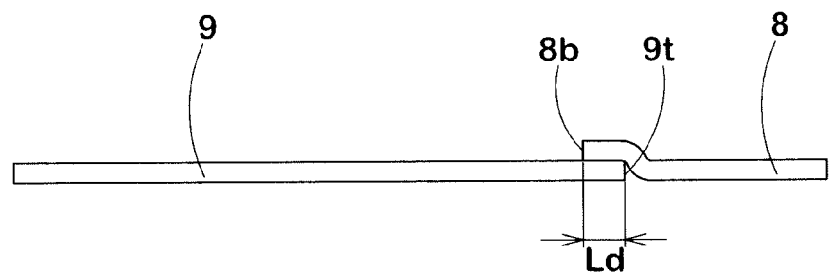
FIG. 4B is a cross sectional view taken along the line Y2-Y2 of FIG. 4A.

As shown in FIG. 4B, when overlapped length Ld of the tip-side bias layer 8 and the butt-side bias layer 9 in the axial direction of the shaft is too large, the torsional rigidity becomes excessive in an overlapped area, and the hit ball feeling may deteriorate. Thus, the overlapped length Ld is preferably equal to or less than 10 mm and more preferably equal to or less than 8 mm. In an aspect in which the overlapped length Ld is less than 0 mm, specifically, the butt-side end 8b of the tip-side bias layer 8 is spaced from the tip-side end 9t of the butt-side bias layer 9, the torsional strength of the shaft 3 may decrease and the durability may deteriorate in the spaced area.

It is desirable that the tip-side bias layer 8 and the butt-side bias layer 9 are present in a same layer. Due to this, when the prepreg sheets P are heated and hardened, the tip-side bias layer 8 and the butt-side bias layer 9 are strongly bonded, the torsional rigidity as the entire shaft 3 is ensured, and the directional stability of the hit ball is improved. The above-mentioned "are present in a same layer" means a state in which no fiber layers exist between the tip-side bias layer 8 and the butt-side bias layer 9 in a radial direction of the shaft, and includes an aspect in which the tip-side bias layer 8 and the butt-side bias layer 9 overlap in a range of the overlapped length Ld described above.

The bias layer 7 including the tip-side bias layer 8 and the butt-side bias layer 9 is formed by cutting into a predetermined shape prepreg sheets for a bias layer which have been separately manufactured in advance and have different tensile elastic moduli, and bonding abutment portions and overlapping portions of these ends with an adhesive, for example.

In this embodiment, as shown in FIG. 2, the tip-side bias layer 8 includes a first tip-side bias layer 8x in the inner side of the radial direction of the shaft and a second tip-side bias layer 8y which overlaps the first tip-side bias layer 8x in the outer side of the radially outside the shaft. In addition, bias fibers 7a1 in the first tip-side bias layer 8x and bias fibers 7a2 in the second tip-side bias layer 8y are oppositely oriented each other. Such a tip-side bias layer 8 is desirable that it can eliminate anisotropy of the shaft 3. In order to produce such an action effectively, it is desirable that an absolute value of an angle of the bias fibers 7a1 with respect to the axial direction of the shaft is same as that of an angle of the bias fibers 7a2 with respect to the axial direction of the shaft.

From a similar viewpoint, the butt-side bias layer 9 includes a first butt-side bias layer 9x and a second butt-side bias layer 9y which overlaps the first butt-side bias layer 9x in the outer side of the radial direction of the shaft. Bias fibers 7a3 in the first butt-side bias layer 9x and bias fibers 7a4 in the second butt-side bias layer 9y are oriented at a same angle and oppositely to each other.

It is desirable that the angle θt of bias fibers in the tip-side bias layer 8 with respect to the axial direction of the shaft is larger than the angle θb of bias fibers in the butt-side bias layer 9 with respect to the axial direction of the shaft. Specifically, when the angle of bias layers with respect to the axial direction of the shaft becomes large, the torsional strength of the shaft improves. For this reason, it is desirable to make the angle θt larger than the angle θb to improve the torsional strength at the tip end 3a side of the shaft 3 on which shock at impact considerably acts and to improve the durability of the shaft 3. When the angle of bias fibers with respect to the axial direction of the shaft becomes small, the flexural rigidity of the shaft 3 improves. For this reason, making smaller the angle θb of bias fibers in the butt-side bias layer 9 enables reduction of the straight layer 5 which improves the flexural rigidity at least on the butt end 3b side, and thereby being able to trim weight of the shaft 3.

A difference θt-θb between the angles θt and θb is preferably equal to or greater than 10 degrees and more preferably equal to or greater than 15 degrees, and preferably equal to or less than 25 degrees and more preferably equal to or less than 20 degrees. Specifically, when the difference θt-θb is small, the action described above may degrade. To the contrary, when the difference θt-θb is large, the torsional rigidity excessively decreases, and the directional stability of the hit ball may be degraded.

In order to improve the flexural rigidity of the shaft 3, the angle θb of the butt-side bias layer 9 is preferably equal to or less than 40 degrees and more preferably equal to or less than 35 degrees. When the angle θb is excessively small, the torsional strength of the entire shaft may decrease. For this reason, the angle θb is preferably equal to or greater than 15 degrees and more preferably equal to or greater than 25 degrees.

In order to improve the hit ball feeling and durability in a well-balanced manner, the angle θt of the tip-side bias layer 8 is preferably equal to or greater than 35 degrees and more preferably equal to or greater than 40 degrees, and preferably equal to or less than 55 degrees and more preferably equal to or less than 50 degrees.

It is desirable that length Lt of the tip-side bias layer 8 is length of 1/10 to 4/10 of the shaft total length LS. Specifically, when the length Lt becomes small, the effect of reducing the torsional rigidity is not produced adequately, and the hit ball feeling at impact may deteriorate. In addition, the effect of improving the torsional strength is not produced. On the other hand, when the length Lt becomes large, the effect by the butt-side bias layer 9 is not produced, and improvement of the directional stability of the hit ball cannot be achieved adequately. For this reason, the length Lt is preferably equal to or greater than 15% of the shaft total length LS and more preferably equal to or greater than 20%, and preferably equal to or less than 35% and more preferably equal to or less than 30%. The length Lt of the tip-side bias layer 8 shall be the shortest length from the tip end 3a when the butt-side end 8b of the tip-side bias layer 8 is inclined with respect to the axial direction of the shaft.

It is desirable that length Le of the butt-side end 8b of the tip-side bias layer 8 and the tip-side end 9t of the butt-side bias layer is in a range of from 50 to 100 mm.

Although the present invention has been described so far in detail, the present invention is not limited to the specific embodiments described above and may be changed to different aspects as needed.

Comparison Test:

In order to confirm advantageous effects of the present invention, the golf club as shown in FIG. 1 was prototyped, and tests were conducted on performance of the directional stability of the hit ball and the hit ball feeling. For the shafts used in the testing, the examples 1 to 6 and comparative examples 5, 6 were created based on the development views shown in FIGS. 2 to 4. The shafts in the comparative examples 1 to 4 were fabricated based on the development view shown in FIG. 5.

Figure 5:
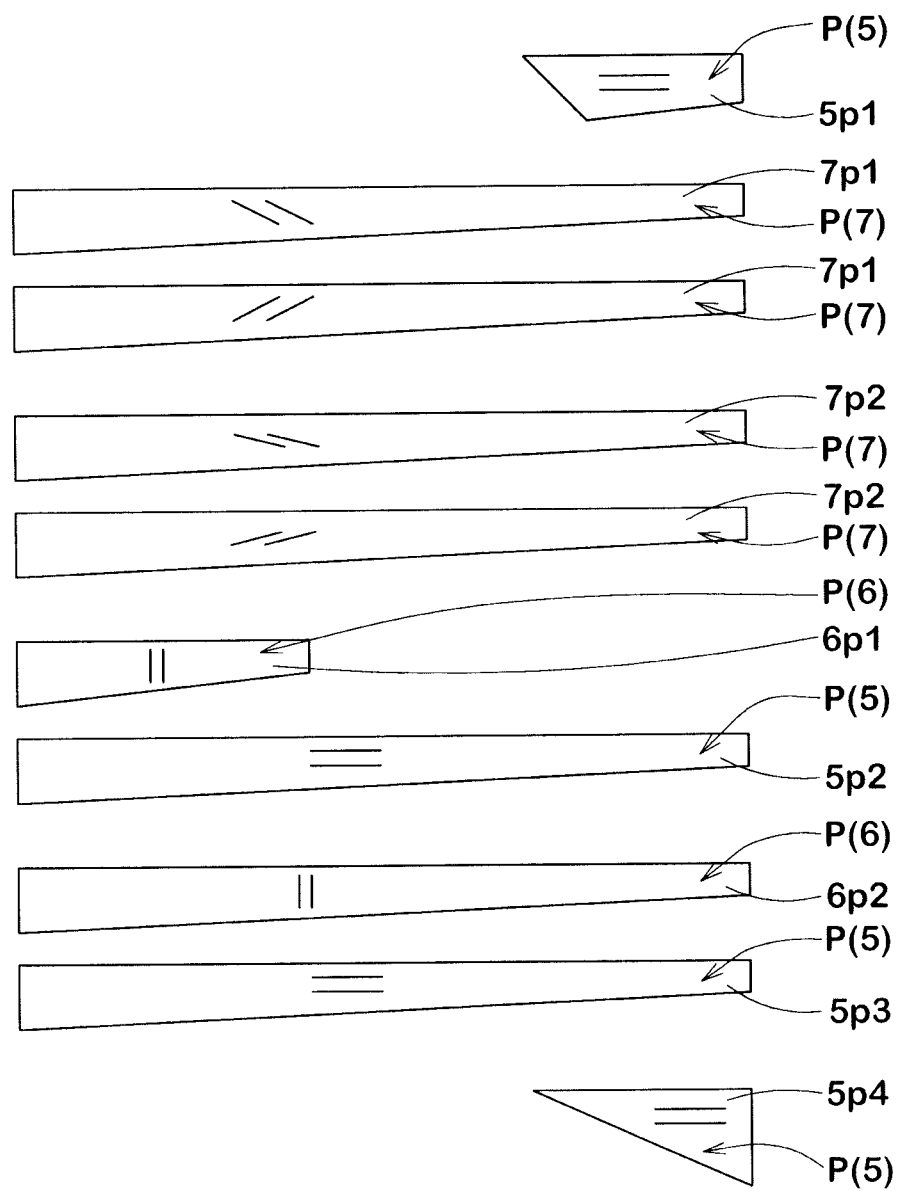
FIG. 5 is a development view of prepreg sheets constituting a shaft of a comparative example.

As shown in FIGS. 2 and 5, in the shafts used in the testing, the straight layer and hoop layer excluding the bias layers are sequentially constituted of a first straight layer 5p1, first hoop layer 6p1, second straight layer 5p2, second hoop layer 6p2, third straight layer 5p3, and fourth straight layer 5p4, from the radially inner side of the shaft.

The bias layers 7 of the shaft shown in FIG. 5 are all constituted of total length bias layers, and constituted of two first total length bias layers 7p1 with orientation angles of bias fibers being opposite to each other, and two second total length bias layer 7p2 with orientation angles of bias fibers being opposite to each other, from the inner side of the shaft.

Golf club heads were those made of titanium alloy and having a same shape and same volume. Table 1 shows physical properties of prepreg sheets to be used in a bias layer, straight layer, and hoop layer in the testing.

For each shaft, parameters other than those shown in Table 2 are same, and main common specifications are as follows:
  Head mass: 190 g
  Head volume: 460 $cm^3$
  Shaft total length Ls: 115 cm
  Shaft mass: 55 g
  Total mass of a golf club: 291 g
  First straight layer 5p1: TR350C-125S
  Third straight layer 5p1: TR350C-100S
  Fourth straight layer 5p4: MR350C-125S
  First hoop layer 6p1: P805S-3
  second hoop layer 6p2: P805S-3

"Torque" shown in Table 2 was measured as a torsional angle (deg.) of the shaft at the torque acting position when, as shown in FIG. 6, the tip end 3a of the shaft 3 is fixed by a 40 mm wide first jig M1 so that the tip end cannot rotate, a position which is spaced by a distance of 825 mm from the first jig M1 to the shaft axis direction is grasped by a 50 mm wide second jig M2, and the shaft 3 is twisted by acting torque Tr of 13.9 kgf/cm on the second jig M2. Thus, the shaft with small torque is not easily twisted during a swing, and to the contrary, the shaft with large torque is easily twisted. The torque Tr was loaded at equal to or less than an angular speed of 130°/min. The first and second jigs M1, M2 were air chucks, respectively, and had grasping pressure of 2.0 kgf/$cm^2$ and 1.5 kgf/$cm^2$, respectively.

The "torsional strength" as shown in Table 2 was calculated by a product (N·m·deg.) of torque (N·m) and an angle of rotation (deg.) when, as shown in FIG. 7, length parts of 50 mm at both ends of the shaft were fixed, on the basis of "Approval Standard for Golf clubs" defined by Consumer Product Safety Association, torque was then applied, and the shaft broke. In the specification, it is desirable that the torsional strength is equal to or greater than 1000 N·m·deg.

A test method is as follows:

Directional Stability of a Hit Ball:

Five 5- to 15-handicapped, right-handed golfers hit six golf balls each with each club, and the directional stability of hit balls was evaluated based on senses of the five golfers mentioned above. The standard is as follows. The larger numeric value is, the better the directional stability is.
  5: The directional stability is very good.
  4: The directional stability is slightly good.
  3: The directional stability is normal.
  2: The directional stability is slightly poor.
  1: The directional stability is very poor.

Hit Ball Feeling:

The feeling that the golfers had during the testing described above was evaluated by the following five grades. The larger numeric value is, the better the hit ball feeling is
  5: very good
  4: slightly good.
  3: Normal
  2: slightly bad.
  1: very bad.

Table 2 shows test results, and the like.

TABLE 1

| Manufacturer name | Product name of prepreg sheet | Sheet thickness (mm) | Fiber content rate (mass %) | Resin content rate (mass %) | Carbon fiber product No. | Carbon fiber physical properties | |
| --- | --- | --- | --- | --- | --- | --- | --- |
| | | | | | | Tensile elastic modulus* (tonf/$mm^2$) | Tensile strength* (kgf/$mm^2$) |
| Nippon Graphite Fiber Corporation | E5526D-10H | 0.090 | 70 | 30 | HB-55 | 55 | 160 |
| Mitsubishi Rayon Co., Ltd. | TR350C-100S | 0.083 | 75 | 25 | TR 50S | 24 | 500 |
| Mitsubishi Rayon Co., Ltd. | TR350C-125S | 0.103 | 75 | 25 | TR 50S | 24 | 500 |
| Mitsubishi Rayon Co., Ltd. | TR350C-150S | 0.124 | 75 | 25 | TR 50S | 24 | 500 |
| Mitsubishi Rayon Co., Ltd. | MR350C-100S | 0.085 | 75 | 25 | MR 40 | 30 | 450 |
| Mitsubishi Rayon Co., Ltd. | MR350C-125S | 0.106 | 75 | 25 | MR 40 | 30 | 450 |
| Mitsubishi Rayon Co., Ltd. | MR350C-150S | 0.127 | 75 | 25 | MR 40 | 30 | 450 |
| Mitsubishi Rayon Co., Ltd. | HRX350C-110S | 0.083 | 75 | 25 | HR 40 | 40 | 450 |

TABLE 1-continued

| Manufacturer name | Product name of prepreg sheet | Sheet thickness (mm) | Fiber content rate (mass %) | Resin content rate (mass %) | Carbon fiber product No. | Carbon fiber physical properties | |
|---|---|---|---|---|---|---|---|
| | | | | | | Tensile elastic modulus* (tonf/mm$^2$) | Tensile strength* (kgf/mm$^2$) |
| Mitsubishi Rayon Co., Ltd. | HRX350C-130S | 0.103 | 75 | 25 | HR 40 | 40 | 450 |
| Mitsubishi Rayon Co., Ltd. | HSX350C-075S | 0.056 | 75 | 25 | HS 40 | 46 | 470 |
| Mitsubishi Rayon Co., Ltd. | HSX350C-110S | 0.082 | 75 | 25 | HS 40 | 46 | 470 |
| Mitsubishi Rayon Co., Ltd. | HSX350C-130S | 0.102 | 75 | 25 | HS 40 | 46 | 470 |
| Toray Industries, Inc. | P805S-3 | 0.034 | 60 | 40 | M30S | 30 | 560 |

*The tensile strength and the tensile elastic modulus were values measured, conforming to JIS R7601: 1986 "Testing Methods for carbon fibers".

TABLE 2

| | | Comparative example 1 | Comparative example 2 | Comparative example 3 | Comparative example 4 |
|---|---|---|---|---|---|
| Figure showing configuration of prepreg sheets | | FIG. 5 | FIG. 5 | FIG. 5 | FIG. 5 |
| Prepreg sheet product No. | First total length bias layer (7p1) | HSX350C-110S | HSX350C-110S | HB-PP (E5526D-10H) | HB-PP (E5526D-10H) |
| | Second total length bias layer (7p2) | MR350C-100S | HSX350C-110S | TR350C-100S | MR350C-100S |
| | Second straight layer (5p2) | MR350C-150S | MR350C-150S | MR350C-150S | MR350C-150S |
| Overlapped length Ld (mm) | | — | — | — | — |
| Angle difference θt-θb of bias fibers of bias layers (degrees) | | 0 | 0 | 0 | 0 |
| Angle θb of bias fibers of the butt-side bias layer (degrees) | | 45 | 45 | 45 | 45 |
| Torque (deg) | | 5.9 | 5.1 | 5.1 | 4.8 |
| Torsional strength (N·m·deg) | | 1410 | 858 | 1211 | 912 |
| Directional stability of a hit ball [Mark A large numeric value shows good directional stability.] | | 2.6 | 3.4 | 3.4 | 3.6 |
| Hit ball feeling [Mark A large numeric value shows good hit ball feeling.] | | 4.0 | 3.2 | 3.6 | 3.2 |

TABLE 3

| | | Example 1 | Example 2 | Example 3 | Example 4 | Example 5 | Example 6 | Comparative example 5 | Comparative example 6 |
|---|---|---|---|---|---|---|---|---|---|
| Figure showing configuration of prepreg sheets | | FIG. 2 | FIG. 2 | FIG. 2 | FIG. 2 | FIG. 2 | FIG. 2 | FIG. 2 | FIG. 2 |
| Prepreg sheet product No. | Total length bias layer (10) | HSX350C-110S | HB-PP (E5526D-10H) | HSX350C-075S (2PLY) | HSX350C-110S | HSX350C-110S | HSX350C-110S | HSX350C-110S | HSX350C-110S |
| | First tip-side bias layer (8x) | MR350C-100S | TR350C-100S | TR350C-100S | TR350C-100S | MR350C-100S | MR350C-100S | HB-PP (E5526D-10H) | HB-PP (E5526D-10H) |
| | First butt-side bias layer (9x) | HB-PP (E5526D-10H) | HB-PP (E5526D-10H) | HB-PP (E5526D-10H) | HB-PP (E5526D-10H) | HB-PP (E5526D-10H) | HB-PP (E5526D-10H) | MR350C-100S | MR350C-100S |
| | Second tip-side bias layer (8y) | MR350C-100S | TR350C-100S | TR350C-100S | TR350C-100S | MR350C-100S | MR350C-100S | HB-PP (E5526D-10H) | HB-PP (E5526D-10H) |
| | Second butt-side bias layer (9y) | HB-PP (E5526D-10H) | HB-PP (E5526D-10H) | HB-PP (E5526D-10H) | HB-PP (E5526D-10H) | HB-PP (E5526D-10H) | HB-PP (E5526D-10H) | MR350C-100S | MR350C-100S |
| | Second straight layer (5p2) | MR350C-150S | MR350C-150S | MR350C-100S | MR350C-150S | MR350C-150S | MR350C-150S | MR350C-150S | MR350C-150S |
| Overlapped length Ld (mm) | | 5 | 5 | 5 | 10 | 20 | 50 | 5 | −1 |
| Angle difference θt − θb of bias fibers of bias layers (degrees) | | 0 | 0 | 15 | 0 | 0 | 0 | 45 | 45 |
| Angle θb of bias fibers of the butt-side bias layer (degrees) | | 45 | 45 | 30 | 45 | 45 | 45 | 45 | 45 |
| Torque (deg) | | 4.9 | 4.3 | 4.7 | 4.9 | 4.8 | 4.6 | 5.1 | 5.2 |

TABLE 3-continued

|  | Example 1 | Example 2 | Example 3 | Example 4 | Example 5 | Example 6 | Comparative example 5 | Comparative example 6 |
|---|---|---|---|---|---|---|---|---|
| Torsional strength (N · m · deg) | 1395 | 1202 | 1593 | 1419 | 1426 | 1450 | 813 | 732 |
| Directional stability of a hit ball [Mark A large numeric value shows good directional stability.] | 3.6 | 4.4 | 4.0 | 3.6 | 3.7 | 3.8 | 3.4 | 34 |
| Hit ball feeling [Mark A large numeric value shows good hit ball feeling.] | 4.0 | 3.8 | 4.0 | 4.0 | 3.9 | 3.6 | 3.0 | 3.1 |

As a result of the tests, it could be confirmed that in the golf clubs of the examples, the hit ball feeling and directional stability of the hit ball were improved in a well-balanced manner, when compared with the golf clubs of the comparative examples. In addition, similar tests were conducted using shafts in which materials of prepreg sheets excluding bias layers containing a tip-side bias layer and a butt-side bias layer are varied, and same tendency as the results of the testing was shown.

What is claimed is:

1. A golf club shaft having a tip end to which a golf club head is attached and a butt end to which a grip is attached, wherein
    the shaft is composed of a fiber reinforced resin having a fiber layer, and a straight layer continuous along a shaft total length
    the fiber layer contains a bias layer having bias fibers oriented at an angle with respect to an axial direction of the shaft,
    the bias layer includes:
        a tip-side bias layer extending from the tip end toward the butt end and having a butt-side end terminating without reaching the butt end, wherein the tip-side bias layer has a length being from 1/10 to 4/10 of the shaft total length, and wherein at least one of said bias fiber in the tip-side bias layer has an angle of from 35 to 55 degrees with respect to the axial direction of the shaft; and
        a butt-side bias layer extending from the butt end toward the tip end and having a tip-side end terminating without reaching the tip end, wherein at least one of the said bias fiber in the butt-side bias layer has an angle of equal to or greater than 15 degrees with respect to the axial direction of the shaft,
    each bias fiber in the tip-side bias layer has a tensile elastic modulus smaller than that of bias fibers in the butt-side bias layer, and
    the butt-side end of the tip-side bias layer and the tip-side end of the butt-side bias layer are provided in a same position in the axial direction of the shaft, or in a position where the tip-side bias layer and the butt-side bias layer overlap each other.

2. The golf club shaft according to claim 1, wherein
    the tip-side bias layer includes a first tip-side bias layer and a second tip-side bias layer overlapping the first tip-side bias layer in a radial direction of the shaft, and
    bias fibers in the first tip-side bias layer and bias fibers in the second tip-side bias layer are oriented oppositely to each other.

3. The golf club shaft according to claim 1 or 2, wherein the shaft has a taper shape in which a shaft diameter decreases toward the tip end.

4. The golf club shaft according to claim 1 or 2, wherein the tip-side bias layer and the butt-side bias layer are present in a same layer.

5. The golf club shaft according to claim 1 or 2, wherein the tensile elastic modulus of bias fibers in the butt-side bias layer is from 30 to 60 t/mm$^2$.

6. The golf club shaft according to claim 1 or 2, wherein the tensile elastic modulus of bias fibers in the tip-side bias layer is from 20 to 40 t/mm$^2$.

7. The golf club shaft according to claim 1 or 2, wherein bias fibers in the tip-side bias layer have angles θt with respect to the axial direction of the shaft larger than angles θb of bias fibers in the butt-side bias layer.

8. The golf club shaft according to claim 1 or 2, wherein at least one of said bias fiber in the butt-side bias layer has an angle θb of equal to or less than 40 degrees with respect to the axial direction of the shaft.

9. The golf club shaft according to claim 1 or 2, wherein the tip-side bias layer overlaps the butt-side bias layer for length of equal to or less than 10 mm in the axial direction of the shaft.

10. The golf club shaft according to claim 1 or 2, wherein a difference Eb-Et between the tensile elastic modulus Eb of bias fibers in the butt-side bias layer and the tensile elastic modulus Et of bias fibers in the tip-side bias layer is from 8 to 40 t/mm$^2$.

11. The golf club shaft according to claim 1 or 2, wherein a difference θt-θb between the angle θt of bias fibers in the tip-side bias layer with respect to the axial direction of the shaft and the angle θb of bias fibers in the butt-side bias layer with respect to the axial direction of the shaft is from 10 to 25 degrees.

12. The golf club shaft according to claim 1 or 2, wherein a length Lt of the tip-side bias layer is in a range of from 15 to 35% of the shaft total length.

13. A golf club comprising the golf club shaft according to claim 1 or 2 and a golf club head attached to the tip end of the golf club shaft.

* * * * *